N. LINDEN.
Coffee Roaster.

No. 109,228. Patented Nov. 15, 1870.

Witnesses
Inventor
N. Linden
By Farwell, Ellsworth & Co.
Attorneys.

United States Patent Office.

NICHOLAS LINDEN, OF CHICAGO, ILLINOIS.

Letters Patent No. 109,228, dated November 15, 1870.

IMPROVEMENT IN COFFEE-ROASTERS

The Schedule referred to in these Letters Patent and making part of the same.

*To all whom it may concern:*

Be it known that I, NICHOLAS LINDEN, of Chicago, in the county of Cook and State of Illinois, have invented certain new and useful Improvements in Coffee-Roasters; and I do hereby declare the following to be a full, clear, and exact description of the same, reference being had to the accompanying drawing forming part of this specification, in which—

Similar letters of reference in the drawing indicate corresponding parts.

Figure 1:
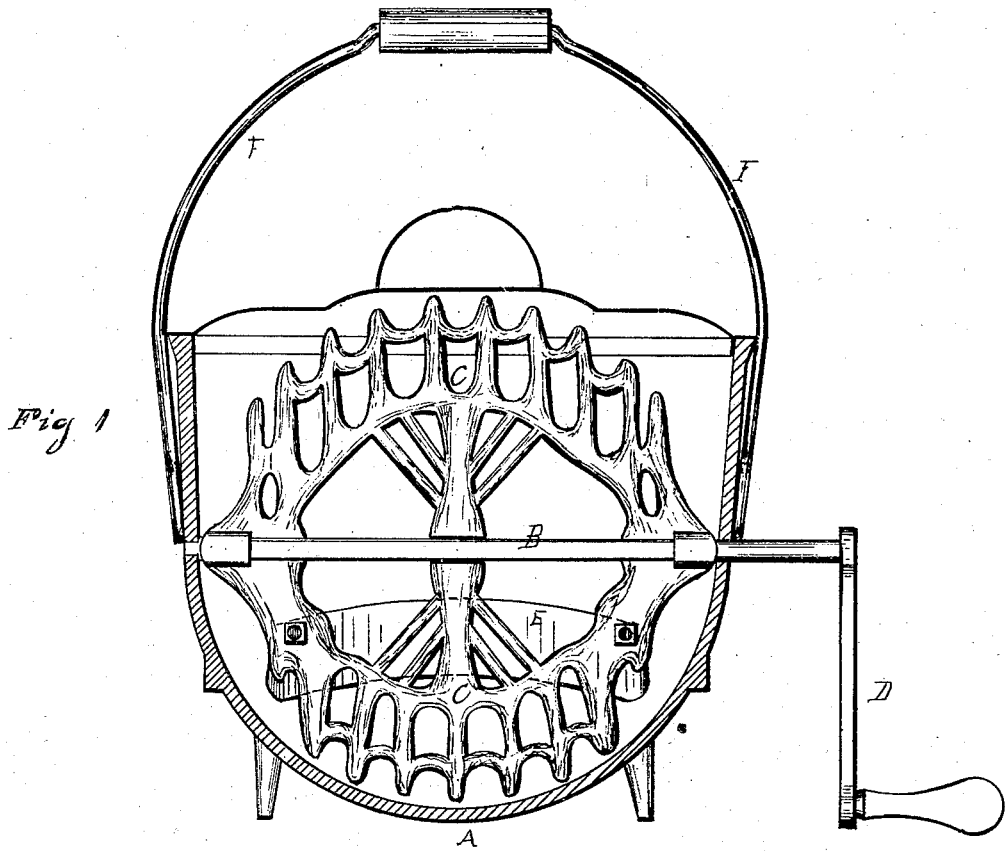
Figure 1 is a vertical section of kettle, showing the stirrer in elevation.
Figure 2:
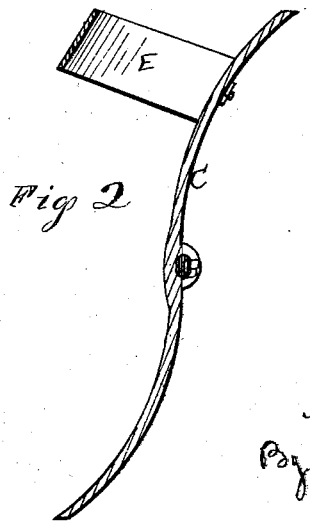
Figure 2 is a transverse vertical section of the stirrer.

The object of this invention is to provide an improved device for roasting coffee, &c.; and It consists in a double-forked shovel placed inside of the kettle for the purpose of stirring the coffee while being roasted.

It also consists in the attachment to the shovel of a metal scraper, adapted to sweep over the bottom of the kettle at every revolution of the stirrer, to lift the coffee from the bottom, and thus prevent the possibility of its becoming burnt or roasted too much. By this means the coffee is roasted perfectly even.

It further consists in attaching the bale of the kettle near the middle of the latter, and nearly on the axial line of the shaft by which the stirrer is revolved, for the purpose of rendering the device much easier to handle when it is desired to discharge or empty the roasted coffee.

In the drawing—

A represents the kettle, and

B, the shaft, to which the double-forked shovel C, made S-shape in form longitudinally, is firmly attached by any suitable means.

The shaft is rotated by the crank D, as shown.

E is the scraper, secured, by means of screws or bolts and nuts, to the rear side of one arm of the double-forked shovel, near its outer end.

The scraper E may be made of common sheet-iron or any other suitable material, but I prefer sheet-iron because it can be formed with ease to fit either an oval or round-bottomed kettle, or a flat-bottomed one, as may be required.

F is the bail, attached to the kettle, by a screw-bolt and nut, at about the middle of the kettle or just above the shaft B, and on the same side where the shaft comes through the side of the kettle, that the handle of shaft and bail may be used together to discharge the coffee with much greater facility than though the bail was attached by ears at the top of the kettle, in the usual manner.

The advantage of my improvement is that, by the scraper sweeping closely on the bottom, all the coffee upon the bottom of the kettle is removed and carried upward at every revolution of the stirrer, and precludes any possibility of burning or roasting the coffee too much. By the peculiar attachment of the bail the kettle can be emptied with very little labor.

Having thus described my invention,

What I claim as new therein, and desire to secure by Letters Patent, is—

1. The coffee-roaster, composed of the kettle A, having bail F attached to its side, as shown, the double-forked shovel C, crank-shaft B, and scraper E, substantially as described, for the purpose set forth.

2. The scraper E, in combination with the S-shaped shovel C, substantially as and for the purpose specified.

The above specification of my invention signed by me this 15th day of August, 1870.

NICHOLAS LINDEN.

Witnesses:
N. K. ELLSWORTH,
E. A. ELLSWORTH.